April 11, 1961     C. H. BLANTON     2,978,927
HANDLE ASSEMBLY
Filed Dec. 14, 1959

CHARLES H. BLANTON
*INVENTOR.*

BY John R. Faulkner
John J. Roethel
ATTORNEYS

United States Patent Office 2,978,927
Patented Apr. 11, 1961

2,978,927

HANDLE ASSEMBLY

Charles H. Blanton, Birmingham, Mich., assignor to Ford Motor Company, Dearborn, Mich., a corporation of Delaware Filed Dec. 14, 1959, Ser. No. 859,493

2 Claims. (Cl. 74—545)

This invention relates to a handle assembly and has particular reference to a crank handle assembly for actuating window control mechanisms of motor vehicles.

Currently, conventional window mechanism actuating handles comprise a die cast metal crank member provided with a rotatable control knob. The conventional control knob comprises a molded plastic hand grip portion provided with a steel pin insert. In assembling the knob to the crank handle member, the exposed portion of the steel pin is inserted through an aperture at the swingable end of the crank handle. The projecting portion of the steel pin is spun over to provide a means for retaining the knob on the handle, it being intended that the knob be freely rotatable relative to the crank handle. At times the projecting end is spun over more than is required, causing the knob to frictionally bind and rendering the crank handle difficult to operate.

It is an object of the present invention to provide a novel connection between a knob and a handle which eliminates the use of the steel pin and, therefore, the spinning over operation in assembly. It is a further object of the present invention to provide a crank handle assembly having parts which may be economically manufactured, easily assembled and efficient in use.

In the illustrated embodiment of the present invention the knob is retained on the swingable end of the crank handle by a retention means. The retention means comprises an element having a shank portion provided with a tapered shoulder at one end which is slightly larger in diameter than the shank. The shank and its associated shoulder are so constructed and arranged that the shoulder may be compressed to a diameter equal to the diameter of the shank upon being forced through the aperture in the crank handle which is adapted to rotatably journal the shank after assembly of the knob to the crank handle. The shoulder, after being forced through the aperture, is adapted to expand to its original free dimension thereby retaining the knob on the crank handle.

In one illustrated embodiment of the present invention the retention means is formed as an integral part of the knob. In a second illustrated embodiment, the retention means is formed as a part of an independent member adapted to be associated with the knob to retain the latter on the swingable end of the crank member.

Other objects and advantages of this invention will be made more apparent as this description proceeds, particularly when considered in connection with the accompanying drawings, wherein.

Figure 1:
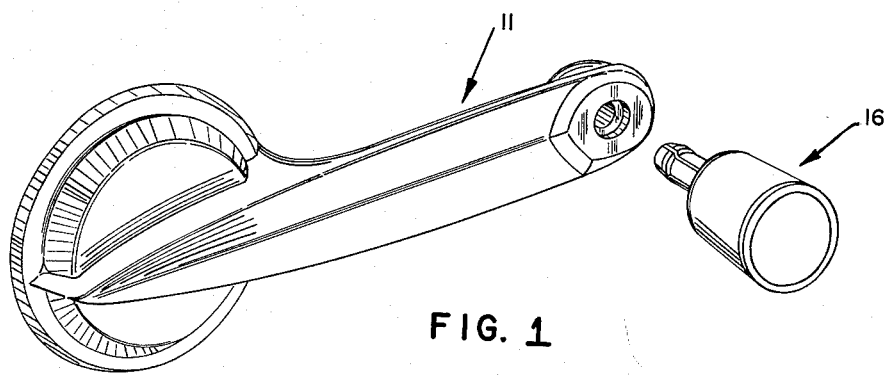
Figure 1 is an exploded view in perspective illustrating a handle assembly incorporating the present invention.
Figure 3:
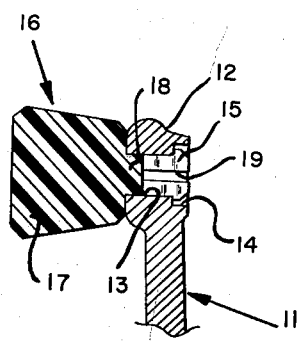
Figure 3 is a sectional view taken substantially through the line 3—3 of Figure 2 looking in the direction of the arrows.
Figure 2:
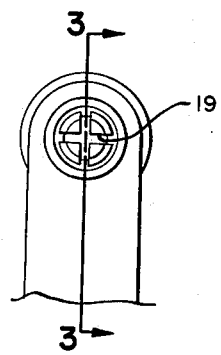
Figure 2 is a bottom view of a portion of the crank handle assembly shown in Figure 1.

Referring now to the drawing, Figure 1 to 3, inclusive, illustrate one embodiment of the present invention in which a crank handle 11 is provided with a knob 16 to serve as a grip to assist in imparting rotation to the crank handle. The crank handle 11, which can be of any desired form, is conventionally connected to a spindle (not shown) of a window regulating mechanism of an automobile to raise or lower the window upon manual rotation of the crank handle 11.

The crank handle, generally designated 11, has a boss 12 which is provided with an aperture 13. The aperture 13 has a counter-bored portion 14 on one end and receives the tapered shoulder 15 of the knob 16 on the other end. The integrally molded knob 16 comprises a knob head 17 with a shank 18 having at the end a tapered shoulder 15 slightly greater in diameter than the shank 18. The tapered shoulder 15 and the shank 18 are provided with crossed slots 19 as seen in Figure 3. The slots 19 are of a sufficient width to permit the tapered shoulder 15 to be compressed to the diameter of the aperture 13 in the crank handle 11 as it is forced through the aperture 13.

When the knob 16 is drivingly engaged with the crank handle 11, the tapered shoulder 15 is projected through the aperture 13 into the counter-bored portion 14 in the boss 12 of the crank handle 11 as seen in Figure 3. The tapered shoulder 15 is then free to expand to its original free dimension. The tapered shoulder 15 on the one side and the knob head 17 on the other side of the crank handle boss 12 provide a retention means preventing withdrawal of the shank 18 from the aperture 13 in the crank handle 11. The diameter of the shank 18 may be slightly smaller in dimension than the diameter of the aperture 13 of the crank handle 11 to permit free rotation of the knob 16 in relation to the crank handle 11.

Figure 4:
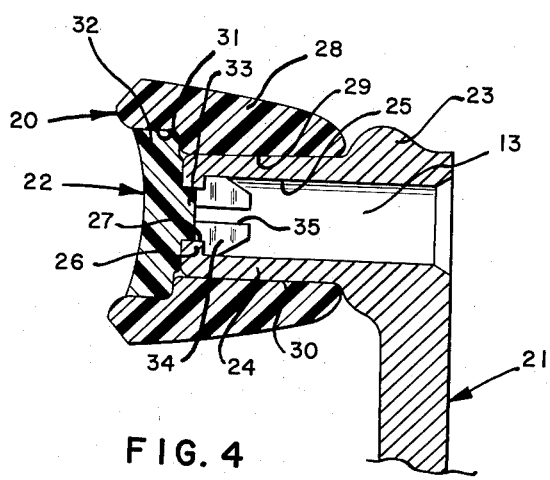
Figure 4 is a sectional view in part similar to Figure 3 illustrating a second embodiment of the present invention.

In Figure 4, a second embodiment of this invention is shown in which a knob assembly 20 is retained in the crank handle, herein designated 21, by a plug 22 which is drivingly engaged with the crank handle 21.

The crank handle 21 has a boss 23 to which a bushing 24 is attached or formed integral therewith. An internal bore 25 of the bushing 24 may be extended through the boss 23 as shown in Figure 4. An internal annular shoulder 26 is formed at one end of the bushing 24 defining an aperture 27 which is circumscribed by the shoulder 26. The aperture 27 is of a smaller diameter than the internal bore 25 of the bushing 24. The knob assembly 20 comprises a knob 28 which has an internal bore 29 of a slightly larger dimension than the external diameter 30 of the bushing 24.

The knob 28 has a cavity 31 at one end, which is of a larger dimension than the internal bore 29 of the knob 28, to receive the plug 22 which has a head 32 of the same configuration as the cavity 31 in the knob 28. Connected to or integrally formed with the plug 22 is a shank 33 having at the end a tapered shoulder 34 which is slightly greater in diameter than the shank proper 33. The shank 33 and the tapered shoulder 34 are provided with crossed slots 35 similar to as shown in Figure 2. The slots 35 are of a sufficient width to permit the tapered shoulder 34 to be compressed to the diameter of the aperture 27.

When the plug 22 is drivingly engaged with the crank handle 21, the tapered shoulder 34 is projected through the aperture 27 into the internal bore 25 of the bushing 24. The tapered shoulder 34 is then free to expand to its original free dimension, its free dimension being of a smaller diameter than the internal bore 25 of the bushing 24.

Before the plug 22 is inserted into the bushing 24 of the crank handle 21, the plug 22 is positioned in the knob 28 so that its head 32 rests in the cavity 31 of the knob 28. When the plug 22 is drivingly engaged with the bushing 24 of the crank handle 21, the tapered shoulder 34 provides a retention means preventing the withdrawal of the shank 33 from the bushing 24 by the internal annular shoulder 26 in the crank handle 21. The retention of the plug 22 by the crank handle 21 also retains the knob 28 to the crank handle 21.

The diameter of the shank 33 may be slightly smaller in dimension than the aperture 27 formed by the shoulder 26 in the bushing 24 to permit free rotation of the plug 22 in relation to the crank handle 21. Also free rotation of the knob 28 in relation to the crank handle 21 and plug 22 can be provided by having the cavity 31 of the knob 28 of a similar but slightly larger circular configuration than the head 32 of the plug 22.

It is to be understood that the form of the invention is not to be limited to the exact construction shown and described but that various changes and modifications may be made without departing from the spirit and scope of the invention as defined in the appended claims.

I claim:

1. A handle assembly comprising a crank handle having a bushing with an internal annular shoulder defining an aperture circumscribed by said shoulder, a knob having a cavity at one end and an internal diameter concentric with the axis of said cavity, said internal diameter being of a smaller dimension than the cavity but larger than the external diameter of the bushing, a plug comprising a head of similar configuration to but slightly smaller than the cavity in the knob, said cavity of the knob receiving the head of said plug, and a shank on said plug provided with a tapered shoulder which is larger in diameter than said shank, a portion of said shank and said tapered shoulder having at least one diametral slot, said slot being of a sufficient width to permit said tapered shoulder to be compressed to fit the diameter of the aperture defined by the internal annular shoulder in the bushing as it is forced through said aperture, said tapered shoulder upon projecting through said aperture into the internal diameter of said bushing expanding to its original free dimension, thereby retaining said knob and said plug on said crank handle.

2. A handle assembly comprising a rotatable crank handle having a bushing integrally formed therewith, said bushing being provided with an internal annular shoulder on its projecting end which defines an aperture circumscribed by said shoulder, a knob having a cavity at one end and an internal diameter concentric with the axis of said cavity, said internal diameter being of a smaller dimension than the cavity but larger than the external diameter of said bushing, a plug comprising a head of similar configuration to but slightly smaller than the cavity in the knob, said cavity receiving the head of said plug, and a shank integrally formed with said plug, said shank provided with a tapered shoulder which is larger in diameter than said shank, said tapered shoulder and a portion of said shank having diametrically crossed slots, said slots being of sufficient width to permit the tapered shoulder to be compressed to fit the diameter of the aperture defined by the internal annular shoulder in the bushing as it is forced through said aperture, said tapered shoulder upon projecting through said aperture into the internal diameter of said bushing expanding to its original free dimension, thereby retaining said plug and said knob on said crank handle.

References Cited in the file of this patent

UNITED STATES PATENTS

| 434,295 | Richardi | Aug. 12, 1890 |

FOREIGN PATENTS

| 680,495 | France | Jan. 22, 1930 |